Dec. 23, 1924.

A. B. MACKEY 1,520,191

METHOD OF MAKING STEERING WHEEL RIMS

Filed Feb. 12, 1923

INVENTOR:
Albert B. Mackey
BY
ATTORNEY.

Patented Dec. 23, 1924.

1,520,191

UNITED STATES PATENT OFFICE.

ALBERT B. MACKEY, OF CLEVELAND HEIGHTS, OHIO, ASSIGNOR TO THE GOLIATH RUBBER COMPANY, OF CLEVELAND, OHIO, A CORPORATION OF OHIO.

METHOD OF MAKING STEERING-WHEEL RIMS.

Application filed February 12, 1923. Serial No. 618,463.

*To all whom it may concern:*

Be it known that I, ALBERT B. MACKEY, a citizen of the United States, resident of Cleveland Heights, county of Cuyahoga and State of Ohio, have invented new and useful Improvements in Methods of Making Steering-Wheel Rims, of which the following is a specification, the principle of the invention being herein explained and the best mode in which I have contemplated applying that principle, so as to distinguish it from other inventions.

My invention relates to rings and particularly to rings suitable for use as rims for the steering-wheels of automotive vehicles.

The object of the invention is to produce, in an economical and efficient manner, a light ring having the necessary physical characteristics of strength, resistance to wear and appearance.

Heretofore it has been customary to use rings for steering wheel rims made of wood, necessarily solid and provided with joints. Such rims are objectionable on account of their weight, expense of manufacture, cost of material and proneness to splitting.

More specifically my invention consists of methods of producing a hollow rim made of rubber vulcanized to produce the required degree of hardness, said rim being unitary, integral and continuous in structure and entirely devoid of joints.

By "rubber" I mean any composition of matter which is ordinarily and often loosely referred to in the art as "rubber" and which might include compositions only resembling real rubber or compounds thereof.

The annexed drawing and the following description set forth in detail certain means embodying and a method designed to carry out my invention, the disclosed means, however, constituting but one of various forms and the described method but one particular method in which the principles of my invention may be applied.

Figure 5:
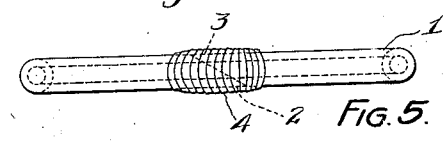

Fig. 5 a side elevation of same.

Figure 6:
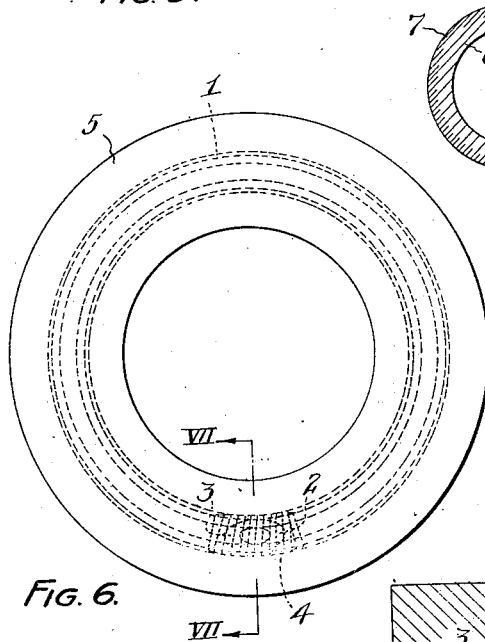

Fig. 6 represents a plan of a mold used in the process of manufacture and showing a wrapped tube thereon in dotted lines.

Figure 7:
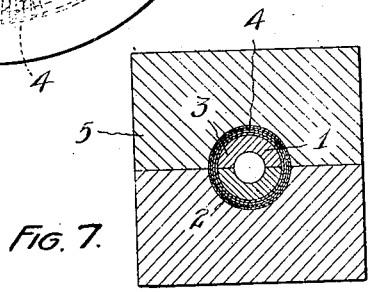

Fig. 7 represents a cross-section of said mold and contained tube taken upon the plane indicated by line VII—VII, Fig. 6.

Figure 8:
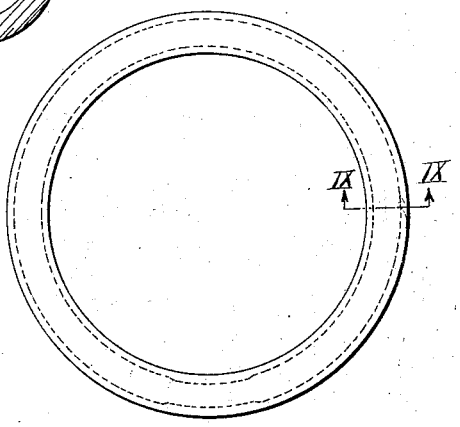

Fig. 8 represents a plan of a finished rim.

Figure 9:
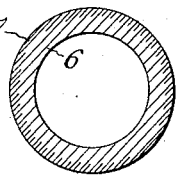

Fig. 9 represents a full sized cross-section of a modified form of rim embodying my invention.

Figure 1:
Fig. 1 represents a side elevation of a piece of unvulcanized rubber tubing from which my improved rim is manufactured.
Figure 2:
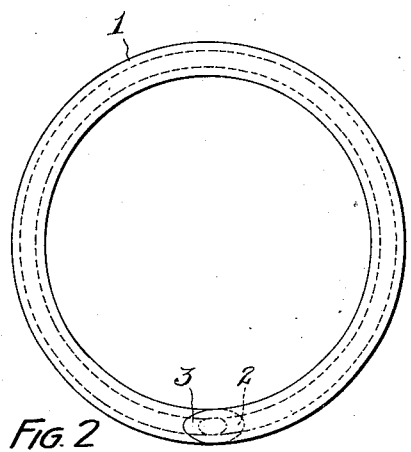
Fig. 2 represents a plan of said tube after being bent around into ring form and prior to wrapping its abutting ends, and Fig. 3 a side elevation of same.
Figure 4:
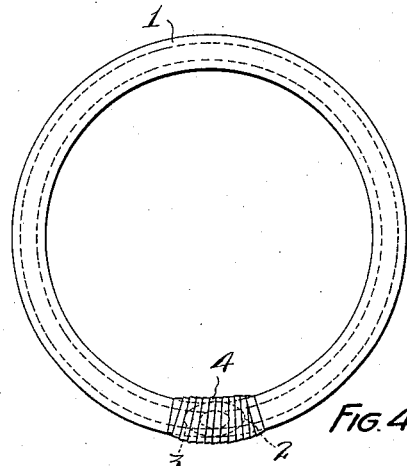
Fig. 4 represents a plan of said tube with the abutting ends wrapped.
Figure 3:
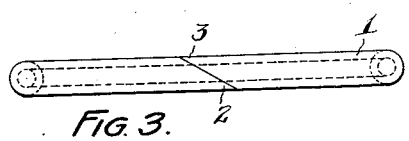

In carrying out my invention I first take a piece of unvulcanized rubber tubing 1 of the required length and bevel its ends 2 and 3 as shown in Fig. 1, upon opposite sides and in opposite directions. A quantity of liquid such as ammonia or a mixture of ammonia and alcohol is then introduced into the interior of the tube. The tube is then bent and the beveled ends caused to abut and overlap as shown in Figs. 2 and 3, which ends are then wrapped with unvulcanized rubber tape to form a section 4 of increased diameter, such tape being of a composition which will vulcanize to the same degree, substantially, as will the tubing 1.

The tube so prepared is then placed in a two-part mold 5, formed with a cavity having the desired ring formation. The cross-sectional area of the cavity is somewhat larger than that of the tube 1 and somewhat smaller than the cross-sectional area of the wrapped section 4. The mold will therefore compress the said section and bring the end planes thereof into close contact.

The mold is then heated to a temperature of about 310° F., at which temperature the rubber of the tube will melt and cause the ends and the rubber tape to weld and form a continuous, integral unbroken structure. The liquid upon the interior gasifies and expands the tube outwardly against the sides of the mold cavity thus imparting accurately the contour of the latter to the formed ring.

The above described method may be varied as follows to produce the modified form of rim shown in Fig. 9, in which the inner portion 6 is of hard or unyielding rubber covered by an integrally united layer 7 of soft or yielding rubber.

To produce such structure, the tube 1 is of a somewhat still smaller diameter than that which is used in the first described process, and is then completely wrapped in unvulcanized rubber tape which is of a composition such that after vulcanization it will be soft or yielding. Such complete wrapping also covers the beveled joint and in so far as concerns the latter effects the same purpose as in the first describel process.

In so far, also, as relates to the union of a soft or yielding outer layer of rubber with a hard or unyielding inner portion, into an integral structure, it is immaterial whether or not the inner portion is solid or hollow, as will be understood by those skilled in the art.

What I claim is:

1. The steps in a method of manufacturing a rubber ring, which consist in taking a tube of unvulcanized rubber; abutting its ends; wrapping the latter with rubber tape; placing the ring so formed in a mold provided with a cavity having the desired ring formation; the cross-section of such cavity being greater than the cross-section of said tube and less than that of such wrapped portion; and then heating same to a vulcanizing temperature capable of welding said ends and tape.

2. The method of manufacturing a hollow rubber ring, which consists in taking a tube of unvulcanized rubber; abutting its ends; wrapping such abutting ends with rubber tape so as to form a section of greater diameter than that of said tube; placing such tube in a mold having a cavity of the desired ring formation; compressing the wrapped section of the tube, heating the tube to a vulcanizing temperature capable of welding such abutting ends and tape, and subjecting the interior of the tube to outward pressure.

3. The method of manufacturing a rubber ring, which consists in bringing the ends of a piece of unvulcanized rubber tubing together; completely wrapping the tubing with unvulcanized rubber tape; and then vulcanizing the whole at a temperture sufficient to weld the joint between the tube ends and the tube and tape.

4. The method of manufacturing a rubber ring, which consists in bringing the ends of a piece of unvulcanized rubber tubing together; completely wrapping the tubing with unvulcanized rubber tape; and then vulcanizing the whole at a temperature sufficient to weld the joint between the tube ends and the tube and tape, said tape being of a composition such as will as a result of such vulcanization, produce a soft or yielding structure.

Signed by me this 30th day of January, 1923.

ALBERT B. MACKEY.